US006658623B1

(12) United States Patent
Schilit et al.

(10) Patent No.: US 6,658,623 B1
(45) Date of Patent: *Dec. 2, 2003

(54) DISPLAYING IN A FIRST DOCUMENT A SELECTABLE LINK TO A SECOND DOCUMENT BASED ON A PASSIVE QUERY

(75) Inventors: William Noah Schilit, Palo Alto, CA (US); Morgan N. Price, Palo Alto, CA (US); Gene Golovchinsky, Palo Alto, CA (US); Mark David Weiser, Palo Alto, CA (US)

(73) Assignees: Fuji Xerox Co., Ltd., Tokyo (JP); Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 136 days.

(21) Appl. No.: 08/929,426

(22) Filed: Sep. 15, 1997

(51) Int. Cl.[7] .................................................. G06F 7/00
(52) U.S. Cl. ..................... 715/513; 715/501.1; 715/512
(58) Field of Search ................................ 707/512, 501, 707/513; 715/501.1, 512, 513

(56) References Cited

U.S. PATENT DOCUMENTS

| 5,341,293 A | * | 8/1994 | Vertelney et al. ............ 707/530 |
| 5,398,310 A | * | 3/1995 | Tchao et al. ................. 707/541 |
| 5,404,295 A | * | 4/1995 | Katz et al. ...................... 707/2 |
| 5,550,965 A | * | 8/1996 | Gabbe et al. ................. 707/512 |
| 5,596,700 A | * | 1/1997 | Darnell et al. ............... 345/340 |
| 5,675,710 A | * | 10/1997 | Lewis ........................... 706/12 |
| 5,708,825 A | * | 1/1998 | Sotomayor ................ 707/501.1 |

(List continued on next page.)

FOREIGN PATENT DOCUMENTS

JP 7-98708 * 4/1995

OTHER PUBLICATIONS

An Investigation of Automatic HTML Coding Method for Images, Fujii et al, Technical report of IEICE, 1995, pp. 30–34.*
Generating HyperText From Printed Text for Electronic Library, Image Recognition and understanding symposium (MIRU) Ohira et al, 1996, pp. 277–282.*
M. Agosti et al., "On the Use of Information Retrieval Techniques for the Automatic Construction of Hypertext," Information Processing & Management, vol. 33, No. 2, pp. 133–144, 1997.
G. Golovchinski, "What the Query Told the Link: The Integration of Hypertext and Information Retrieval," Proceedings of the Eighth ACM International Hypertext Conference, Southampton, UK, Apr. 6–11, 1997, pp. 67–74.

(List continued on next page.)

Primary Examiner—Stephen S. Hong
Assistant Examiner—Cesar B. Paula
(74) Attorney, Agent, or Firm—Oliff & Berridge, PLC

(57) ABSTRACT

The document reading system passively analyzes a document to generate margin or end notes of references to other documents that relate to annotated passages in the document or to the entire document. The invention is responsive to the annotation of a document to passively generate a query that retrieves documents that have similar content to the annotated passage. The retrieved documents are available to the reader through selectable links placed in the margin near the annotation. Additionally, the invention provides end notes with links to documents that are similar in content to the overall content of the annotated document. The invention assists the reader by passively generating selectable links to related documents to assist the user in relating the new document to previously read material.

32 Claims, 4 Drawing Sheets

U.S. PATENT DOCUMENTS

| | | | | | |
|---|---|---|---|---|---|
| 5,740,364 | A | * | 4/1998 | Drerup | 709/217 |
| 5,748,805 | A | * | 5/1998 | Withgott et al. | 382/306 |
| 5,774,109 | A | * | 6/1998 | Winksy et al. | 345/124 |
| 5,806,079 | A | * | 9/1998 | Rivette et al. | 707/512 |
| 5,822,539 | A | * | 10/1998 | Van Hoff | 709/236 |
| 5,870,770 | A | * | 2/1999 | Wolfe | 707/501 |
| 5,873,107 | A | * | 2/1999 | Borovoy et al. | 707/501 |
| 5,893,126 | A | | 4/1999 | Drews et al. | 715/512 |
| 5,911,145 | A | * | 6/1999 | Arora et al. | 707/514 |
| 5,960,448 | A | * | 9/1999 | Reichek et al. | 707/526 |
| 5,970,483 | A | | 10/1999 | Evans | 707/3 |
| 6,028,601 | A | * | 2/2000 | Machiraju et al. | 345/705 |
| 6,104,401 | A | * | 8/2000 | Parsons | 345/804 |
| 6,122,647 | A | * | 9/2000 | Horowitz et al. | 707/513 |
| 6,146,027 | A | * | 11/2000 | Orton et al. | 395/683 |
| 6,154,757 | A | * | 11/2000 | Krause et al. | 707/530 |
| 6,158,903 | A | * | 12/2000 | Schaeffer et al. | 709/204 |
| 6,164,974 | A | * | 12/2000 | Carlile et al. | 434/118 |
| 6,178,431 | B1 | * | 1/2001 | Douglas | 707/512 |
| 6,182,091 | B1 | | 1/2001 | Pitkow et al. | 715/501.1 |
| 6,233,591 | B1 | * | 5/2001 | Sherman et al. | 715/501.1 |
| 6,256,631 | B1 | * | 7/2001 | Malcolm | 707/10 |
| 6,266,684 | B1 | * | 7/2001 | Kraus et al. | 345/800 |
| 6,268,851 | B1 | * | 7/2001 | Bricklin et al. | 345/744 |
| 6,356,922 | B1 | * | 3/2002 | Schilit et al. | 715/512 |

OTHER PUBLICATIONS

D.T. Chang, "*HieNet: A User–Centered Approach for Automatic Link Generation,*" Proceedings of Hypertext '93, , Seattle, WA, Nov. 14–18, 1993, pp. 145–158.

"*Automatic Hypermedia Link Generation,*" IBM Technical Disclosure Bulletin, vol. 35, No. 1A, Jun. 1992, pp. 447–448.

"User Interface Design for the Hyperties Electronic Encyclopedia", Shneiderman, *Proceedings of Hypertext '87*, Nov. 1987, Chapel Hill, NC.

"Programmable Browsing Semantics in Trellis", R. Furuta et al. *Proceedings of Hypertext '89*, Nov. 1989, Pittsburgh, PA, ACM Press.

"Hienet: A User–Centered Approach for Automatic Link Generation", D.T. Chang, *Proceedings of Hypertext '93*, Nov. 1993, Seattle, WA, ACM Press.

"Queries? Links? Is There A Difference?", G. Golovinsky, *Proceedings of CHI '97*, Mar. 1997, Atlanta, GA, ACM Press.

"What the Query Told the Link: The Integration of Hypertext and Information Retrieval", G. Golovinsky, *Proceedings of Hypertext '97*, Apr. 1997, Southhampton, UK, ACM Press.

"A Continuously Running Automatic Information Retrieval System", B.J. Rhodes et al. *Proceedings of The First International Conference on the Practical Application of Intelligent Agents in Multi–Agent Technology*, PAAM '96, Apr., 1997, London, UK.

"Queries–R–Links: Graphical Markup for Text Navigation", by G. Golovchinsky et al., *Proceedings of INTERCHI '93*, Apr. 1993, Amsterdam, The Netherlands, ACM Press.

"Reexamining the Cluster Hypothesis: Scatter/Gather on Retrieval Results", M.A. Hearst et al., *Proceedings of ACM SIGIR '96*, Aug. 1996, Zurich, Switzerland.

"A Trainable Document Summarizer", J. Kupiec et al., *Proceedings of SIGIR '95*, Jul. 1995, Pittsburgh, PA, ACM Press.

"The Transformation, Analysis, and Retrieval of Information by Computer", Gerard Salton, *Automatic Text Processing*, 1989, Addison–Wesley Publishing Co., Inc.

"Effective View Navigation", George W. Furnas, *CHI 97 Electronic Publications: Papers*, 1997, ACM.

* cited by examiner has been demonstrated [28], it still relies on hierarchical structure of each document to support local navigation. SuperBook has been shown to be an effective interface for IR tasks when browsing structured collections [12], but alternatives to the book metaphor must be found to support browsing through loosely-structured hypertext collections.

One such alternative — the newspaper metaphor — is discussed in the following section, and VOIR, a prototype that implements it, is described. Some experimental results from an evaluation of VOIR are presented, and the paper concludes with a discussion of possible extensions and applications of this query-mediated hypertext interfaces.

2 VOIR

This section describes VOIR (Visualization of Information Retrieval), a prototype newspaper-based dynamic hypertext interface. The section first introduces the newspaper metaphor and discusses its implementation in VOIR. A description of VOIR's linking interface follows, and the discussion concludes with an overview of VOIR's visualization features.

Info Via Paper

FIG.2

5 CONCLUSIONS

This paper describes VOIR, a query-mediated hypertext interface designed to support information exploration tasks in very large text databases. It describes a technique for mediating links with passage-based relevance feedback queries. Experimental results indicate that link-based queries produced better performance than passage selections, and that subjects found dynamic hypertext interfaces intuitive to use. This research suggests that integrating hypertext interfaces with full-text search engines can produce effective solutions for a class of information exploration tasks.

This work also has implications for models of information exploration (e.g., [37]) that posit a distinction between selecting anchors and forming queries. Interfaces such as the one described here suggest that the distinction between hypertext and information retrieval can become progressively blurred. As more sophisticated (e.g., agent-based) techniques are integrated into information exploration interfaces (e.g., [26]), some distinctions between semantic and statistical links should also disappear.

Related Documents

 G. Golovchinksy, *Queries? Links? Is There a Difference?*, In Proceedings of CHI '97, (March 1997, Atlanta, GA), ACM Press.

FIG.3

DISPLAYING IN A FIRST DOCUMENT A SELECTABLE LINK TO A SECOND DOCUMENT BASED ON A PASSIVE QUERY

BACKGROUND OF THE INVENTION

1. Field of Invention

This invention relates generally to electronic document reading Systems. In particular, this invention is directed to an electronic document reading system that suggests other related documents when displaying a first document.

2. Description of Related Art

Retrieving documents similar to a document identified by the user as being related is known as relevance feedback. Relevance feedback is described in "Introduction to Modern Information Retrieval", G. Salton et al., McGraw Hill, (1983), incorporated herein by reference in its entirety. Interfaces that support relevance feedback conventionally require explicit action on the part of the reader and do not spontaneously offer suggestions of relevant documents. Information exploration interfaces designed for window-based computing environments typically present search results for other relevant documents via lists in a separate window or by replacing the visible document with the search results. These systems are very intrusive and interrupt the reading process.

Hypertext interfaces display links to documents relevant to a source document either by providing a margin that contains the links or by embedding the links in the text of the source document in the manner pioneered by "Hyperties." This system is described in "User Interface Design for the Hyperties Electronic Encyclopedia", by Shneiderman, *Proceedings of Hypertext '87*, November 1987, Chapel Hill, N.C., incorporated herein by reference in its entirety. However, these links are static and are created along with the source document by the hypertext author. Some systems, such as Trellis, display links dynamically, but only from a fixed set of previously-defined links. Trellis is described in "Programmable Browsing Semantics and Trellis", by R. Furuta et al. *Proceedings of Hypertext '89*, November 1989, Pittsburgh, Pa., ACM Press, incorporated herein by reference in its entirety.

The HieNet System uses inter-node similarity measures to create hypertext links based on links previously created by the hypertext author. This system is described in "Hienet: A User-Centered Approach for Automatic Link Generation", D. T. Chang, *Proceedings of Hypertext '93*, November 1993, Seattle, Wash., ACM Press, incorporated herein by reference in its entirety. When the author creates a link from a document A to a document B, the system automatically adds links from all documents similar to document A to all documents similar to document B. Anchors for these automatically-generated links are represented by icons in the margin of the various documents. Clicking on an icon displays a pop-up menu that contains a list of possible destination documents that are ranked by relevance to the query. Again, this System relies on links previously created by the author.

Other conventional Systems relate to hypertext-like ways of displaying search results. HieNet displays automatic links in the margin, but anchors in the margin are not relevant to the content of the passage adjacent to the anchor. HieNet does not distinguish between document-document and passage-document links. Furthermore, HieNet does not indicate the number and nature of the documents reachable through the margin links.

Visualization of Information Retrieval System (hereinafter VOIR) is described in "Queries? Links? Is There a Difference?", *Proceedings of CHI '97*, G. Golovinsky, March 1997, Atlanta, Ga., ACM Press and in "What the Query Told the Link: The Integration of Hypertext and Information Retrieval", *Proceedings of Hypertext '97*, G. Golovinsky, April 1997, Southhampton, UK, ACM Press, each incorporated herein by reference in its entirety. VOIR is a mechanism that dynamically creates and resolves hypertext links with queries that are computed from the text surrounding a selected anchor. VOIR uses queries to retrieve sets of documents that are related to the passage containing the selected anchor. VOIR does not show the user links that have pre-established relationships. Rather, to submit a query and to establish a relationship, the user has to pause and select an anchor. VOIR was designed specifically to Support interactive information exploration, rather than to facilitate the reading process. Thus, VOIR's focus is supporting navigation between documents. The user is thus expected to devote much cognitive effort to browsing. Furthermore, VOIR does not permit the user to annotate or tag documents. VOIR also does not indicate which link was selected to generate a particular display.

A background information retrieval process called the Remembrance Agent (hereinafter RA) is described in "A Continuously Running Automated Information Retrieval System", B. J. Rhodes et al. *Proceedings of The First International Conference on the Practical Application of Intelligent Agents in Multi-Agent Technology*, PAAM '96, April, 1997, London, UK, incorporated herein by reference in its entirety. RA operates in an EMACS text window and suggests documents related to the last few lines of text typed by the user. RA is designed to search through a user's private data to suggest documents related to the text being typed. However, these suggestions are ephemeral and relate only to text that is currently being written. RA does not support reading tasks because it continuously replaces suggestions as the user edits the document.

QRL is a query-based information exploration interface that uses ink-like marks on text to specie boolean queries. This system is described in "Queries-R-Links: Graphical Markup for Text Navigation", by G. Golovchinsky et al., *Proceedings of INTERCHI '93*, April 1993, Amsterdam, The Netherlands, ACM Press, incorporated herein by reference in its entirety. Query terms are selected with rectangles. Lines connect the rectangles to represent boolean AND operators.

All of these systems require extensive user interaction to generate links to related documents or only support writing. An electronic document reading system is needed that passively and unobtrusively generates links to related documents to support reading.

SUMMARY OF THE INVENTION

This invention provides a method and a system for passively showing the reader related documents without interfering with the reading process.

The invention further provides intuitive support for reading by automatically detecting documents potentially of interest to the reader based on the reader's interaction with the source document being read. When people read text, they often make annotations to highlight interesting or controversial passages and terms. The presence or relative density of such marks and scribbles may be used as an indicator of the relative interest that the reader has in a particular passage. When a large body of documents related to the document being read is available, the reader may be interested in finding related documents as part of the reading process.

References to documents related to specific passages of interest to the user are placed in the source document's margins and references to documents similar overall to the source document are inserted as end notes. The system and method of this invention maintain the links once they have been identified to facilitate non-linear reading and skimming.

A user's interests are inferred from annotations made while reading the source document. Therefore, the system and method of this invention minimize cognitive overhead in two ways: 1) no expressive query is required to identify documents related to the source document; and 2) selectable links to the related documents are provided unobtrusively in the margins and at the end of the document, this is shown in FIGS. 2 and 3, respectively.

The system also introduces suggestions to the reader in a manner compatible with other interactions, rather than burdening the user with modal dialogues. Suggested documents are accessible by following the selectable links. However, the user does not have to act on a suggestion when it is made. Rather, the user can act on the suggestion when (or if) it makes sense to do so. The system and method of this invention represent the type of the referenced document with an icon and provide a textural label to the icon to give users a better understanding of the target of the link.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein:

FIG. 2 shows a source document having an icon in the margin adjacent to an annotated passage;

FIG. 3 shows another source document having an end-note; and

DETAILED DESCRIPTION OF PREFERRED EMBODIMENTS

Figure 1:
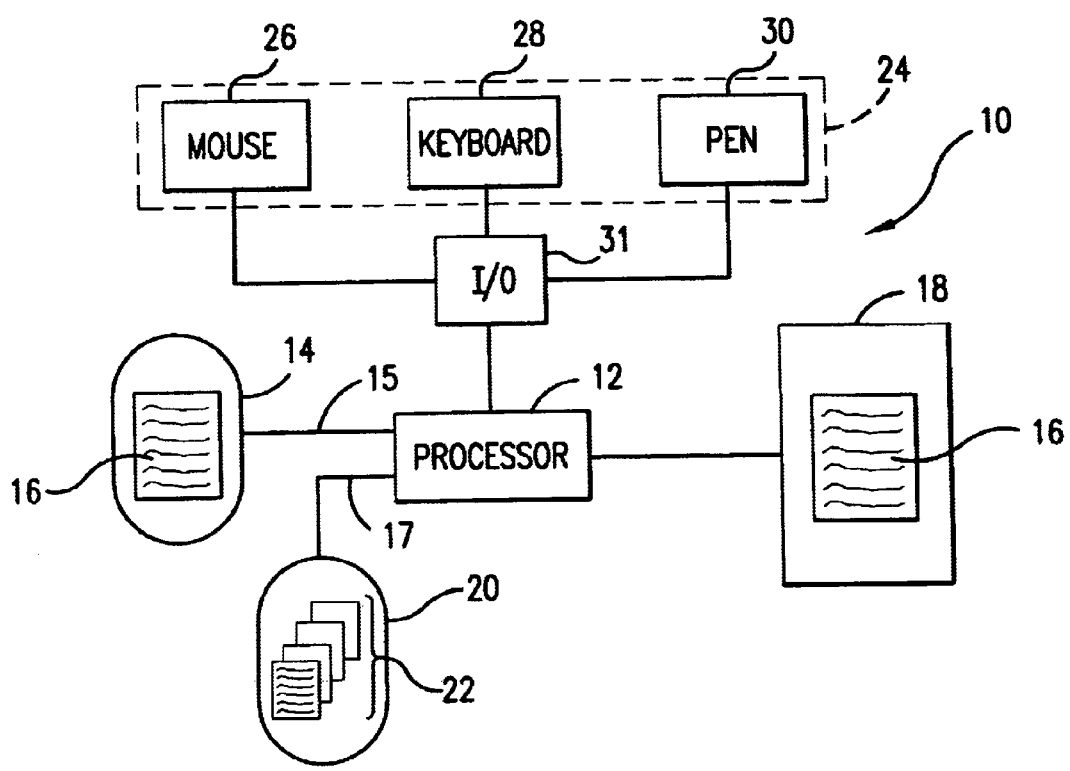
FIG. 1 is a block diagram of one embodiment of the electronic document reading system of this invention.

FIG. 1 shows a block diagram of one embodiment of a document reading system 10 according to this invention. The document reading system 10 includes a processor 12 communicating with a first memory 14 that stores a source document 16 that is currently being read by a user on a display 18. The processor 12 also communicates with a second memory 20 that stores potentially related target documents 22. A user interacts and controls the document reading system 10 through any number of conventional input/output devices 24, such as a mouse 26, a keyboard 28, or a pen-based interface 30. The input/output devices 24 communicate with an input/output interface 31 that, in turn, communicates with the processor 12.

As shown in FIG. 1, the system 10 is preferably implemented on a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIG. 4 can be used to implement the system 10.

Additionally, as shown in FIG. 1, the storage devices or memories 14 and 20 are preferably implemented using static or dynamic RAM. However, the devices 14 and 20 can also be implemented using a floppy disk and disk drive, a writable optical disk and disk drive, a hard drive, flash memory or the like. Also, it should be appreciated that the devices 14 and 20 can be either distinct portions of a single memory or physically distinct memories.

Further, it should be appreciated that the links 15 and 17 connecting the devices 14 and 20 and the processor 12 can be a wired or wireless link to a network (not shown). The network can be a local area network, a wide area network, an intranet, the Internet or any other distributed processing and storage network. In this case, the electronic document 16 is pulled from and physically remote memory device 14 through link 15 for processing in the processor 12 according to the method outlined below. In this case, the electronic document 16 can be stored locally in portion of some other memory device of the system 10 (not shown).

The method of this invention identifies two kinds of target documents 22 for each source document 16. The two types of target documents are: 1) target documents that are specifically related to annotated passages; and 2) target documents that are generally related to the overall source document. Once a relationship is established between the source document and the target documents 22, the target documents may be displayed by clicking on selectable links in the displayed document 16.

References to the two types of target documents 22 is shown in FIG. 2. A target document 22 related to the specific passage 32 in the source document 16 is identified by a margin representation 34 placed in the margin of the source document 16 near the related passage 32. As shown in FIG. 3, a target document 22 that is related to the source document 16 as a whole is annotated and shown as an end-note 36 to the source document. The end note 36 includes the type, the title and summary information.

Figure 4:
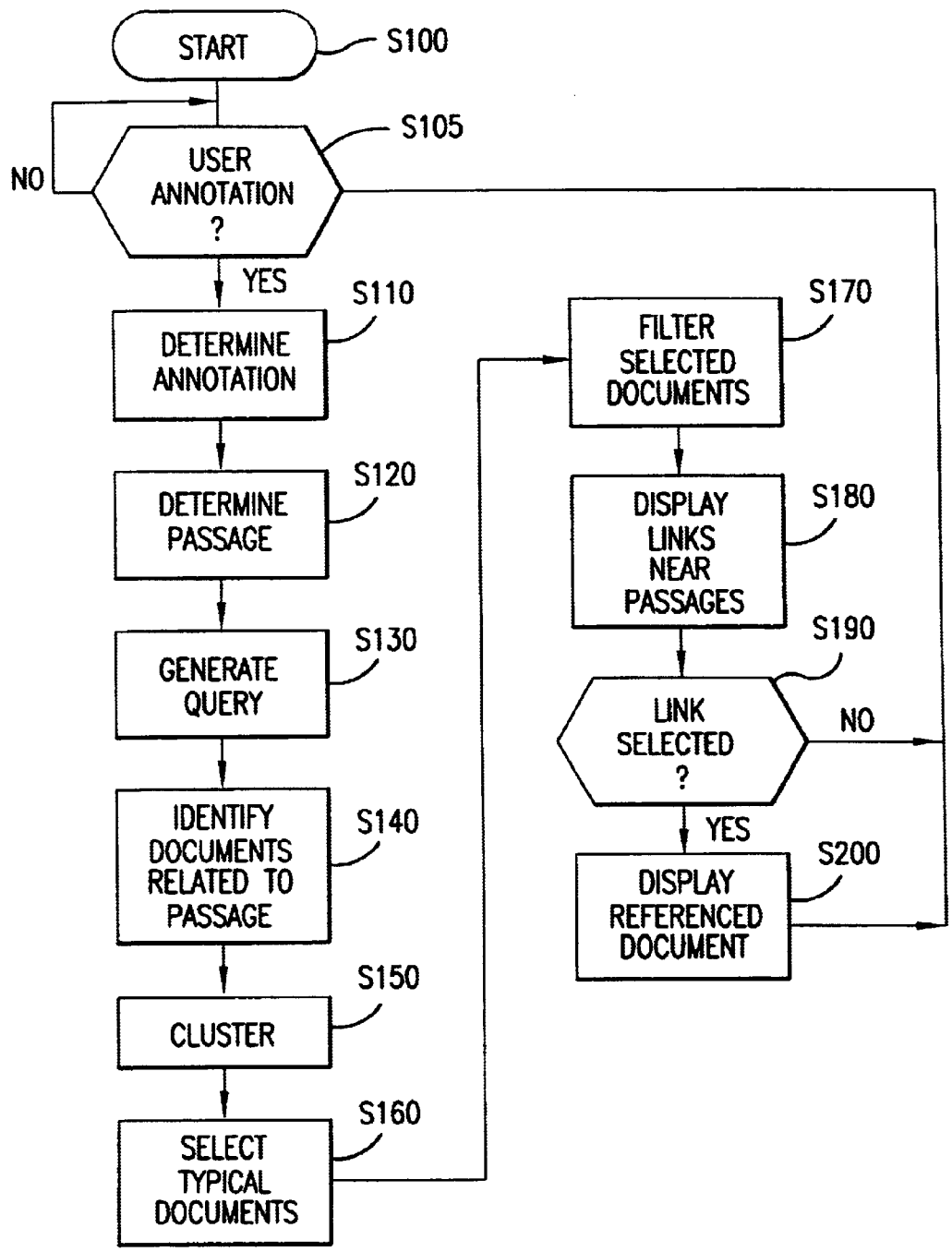
FIG. 4 is a flowchart outlining a control routine for one embodiment of this invention.

FIG. 4 is a flowchart outlining a control routine for one embodiment of the method of this invention. Beginning in step S100, the control routine continues to step S105 In step S105, the control routine determines if the user has made any annotations. If not, control loops back to step S105. If so control continues to step S110. In step S110, the control routine determines the annotation of the source document mode by the user. Next, in step S120, the control routine analyzes the text of the source document and the annotation to determine the passage being annotated. A passage may include a paragraph marked with a margin bar, an underlying sentence or phrase, or the context of one or more circled terms. Then in step S130, the control routine generates a query from the passage. The query includes content-bearing terms from the identified passage that are weighted to give importance to any circled words. Next, in step S140 the control routine searches the target document using the query to identify documents that are related to the passage. Then, at step S150, the search results are clustered. Clustering is preferably performed in a manner similar to that described in "Reexamining the Cluster Hypothesis: Scatter/Gather on Retrieval Results", M. A. Hearst et al., *Proceedings of ACM*

SIGIR '96, August 1996, Zurich, Switzerland, incorporated herein by reference in its entirety.

Next, in step S160, the control routine selects a typical document from each cluster. These documents are further filtered by a user-specified similarity threshold in step S170. Then, in step S180, the remaining documents are identified by displaying links to those documents in the margin of the source document adjacent to the passage from which the query was generated. Each selectable link may be an icon representing a type of the selected and filtered target document and a short title.

Next, in step S190, the control routine determines if a user has selected a selectable link in the current source document. If in step S190, a user has selected a selectable link, the control routine proceeds to step S200. In step S200, the target document is displayed as the new current source document, control then continues back to step S105, where it waits for another annotation to be made. Alternatively, if in step S190, no selectable link is selected, then the control jumps directly back to step S105. The control routine continues until the user has closed all open source documents 16 displayed on the display 18.

To compute end notes the flowchart of FIG. 4 can be used with slight modifications. The control routine proceeds identically as described for the creation of margin notes from step S100 through step S120. However, at step S130 a weighted sum query is generated. In step S130 terms that are explicitly identified by the reader and terms identified by standard relevance feedback techniques are used to construct weighted-sum queries at step S130. The identified terms are assigned weights based upon the annotations made to the document. For instance, words that have been expressly selected by the user are weighted the highest and words that occur in selected paragraphs are weighted higher than the remaining terms of the source document.

Documents that have been identified as related to the document using the weighted sum query generated in step S130 are processed in a manner similar to the remaining steps S140 through S200 with the exception that the link is displayed as an end note in step S180 rather than as a margin note.

It should be understood that either or both of these control routines may be running in the background of a document reading system of the invention.

Optionally, the system and method of this invention may derive summaries from documents through an automatic text summarization process in a manner similar to that described in "A Trainable Document Summarizer", J. Kupiec et al., *Proceedings of SIGIR '95*, July 1995, Pittsburgh, Pa., ACM Press, incorporated herein by reference in its entirety. The summaries are then displayed as end notes.

It is to be understood that the term annotation as used herein is intended to include text, digital ink, audio, video or any other input associated with a document. it is also to be understood that the term document is intended to include text, video, audio and any other media and any combination of media. Further, it is to be understood that the term text is intended to include text, digital ink, audio, video or any other content of a document to include the document's structure.

While this invention has been described with the specific embodiments outlined above, many alternatives, modifications and variations are and will be apparent to those skilled in the art. Accordingly, the preferred embodiments described above are illustrative and not limiting. Various changes may be made without departing from the spirit and scope of the invention as defined in the following claims.

What is claimed is:

1. A method for displaying in a display of a previously authored first document, at least one link to another document, each other document being related to the first document, the method comprising:

identifying at least one annotated segment of the first document entered by a reader while reading the first document;

identifying at least one second document that is related to the at least one annotated segment of the first document; and displaying in the first document a selectable link for each of the at least one second document, wherein the selectable link for each of the at least one second document is displayed in the first document in response to a query passively generated by each annotation marking by the reader while reading the first document, wherein said annotation marking is a non-textual marking to annotate a textual segment used as a basis of the query.

2. The method of claim 1, wherein the selectable link is displayed as an end note to the first document.

3. The method of claim 1, wherein the step of identifying the at least one second document comprises identifying at least one portion of the at least one second document as related to the first document, and wherein the selectable link references the identified at least one portion.

4. The method of claim 3, wherein the identified at least one portion is identified as related to the at least one annotated segment and wherein the selectable link is displayed near the identified at least one reader annotated segment.

5. The method of claim 4, wherein the step of identifying is in response to the entry by the reader of the at least one annotated segment of the first document.

6. The method of claim 5, wherein the step of identifying the at least one second document is in response to the entry by the reader of the at least one annotated segment of the first document.

7. the method of claim 5, wherein the selectable link is displayed in a margin adjacent to the at least one annotated segment.

8. The method of claim 1, wherein the step of identifying the at least one second document comprises determining the relatedness based upon reader identified terms and terms identified using relevance feedback techniques.

9. The method of claim 8, wherein the step of identifying uses weighted-sum queries.

10. The method of claim 1, further comprising the steps of:

determining if the selectable link has been selected; and displaying the identified at least one second document in response to the selection of the selectable link.

11. The method of claim 1, wherein the step of identifying comprises the steps of:

identifying a plurality of second documents as related to the first document;

clustering the identified plurality of second documents; and selecting at least one of the identified plurality of second documents for each cluster that typifies all of the identified plurality of second documents within each respective cluster, wherein the selectable link references the selected at least one of the identified plurality of second documents.

12. The method of claim 1, wherein the relatedness is determined based upon the similarity of the contents of the at least one second document to the first document.

13. The method of claim 12, further comprising the step of filtering out an identified at least one second document that is below a predetermined similarity threshold.

14. The method of claim 1, wherein an icon representing the type of the identified at least one second document is displayed.

15. The method of claim 1, wherein the title of the identified at least one second document is displayed.

16. The method of claim 1, wherein a summary of the identified at least one second document is displayed.

17. An electronic document system for suggesting in a display of a previously authored first document at least one second document that is related to the first document, the system comprising:

a processor that identifies at least one annotated segment of the first document entered by a reader while reading the first document and that identifies at least one second document as related to the at least one annotated segment of the first document; and a display that display a selectable link that references the identified at least one second document in a display of the first document, wherein the selectable link is displayed for each of the identified at least one second document in the display of the first document in response to a query passively generated by each annotation marking by the reader while reading the first document, wherein said annotation marking is a non-textual marking to annotate a textual segment used as a basis of the query.

18. The system of claim 17, wherein the processor identifies the at least one second document based upon the relatedness of the at least one portion of the at least one second document to the first document, and wherein the selectable link references the identified at least one portion.

19. The system of claim 18, wherein the processor identifies at least one annotated segment of the first document and identifies the at least one portion as related to the identified at least one annotated segment, wherein the selectable link is displayed near the identified at least one annotated segment.

20. The system of claim 17, wherein the selectable link is displayed as an end note to the first document.

21. The system of claim 17, further comprising a user input interface, wherein the processor is responsive to the annotation of a segment of the first document by the reader to identify the at least one second document.

22. The system of claim 20, wherein the selectable link is displayed in the margin adjacent to the at least one annotated segment.

23. The system of claim 17, wherein the processor identifies the at least one second document based upon reader identified terms and terms identified based upon relevance feedback techniques.

24. The system of claim 23, wherein the processor also identifies the at least one second document based upon weighted-sum queries.

25. The system of claim 17, further comprising a user interface, wherein the display is responsive to the selection of the selectable link by the reader to display the identified at least one second document.

26. The system of claim 17, wherein the processor identifies a plurality of second documents based upon their relatedness to the first document, clusters the identified plurality of second documents and selects at least one of the plurality of identified second documents for each cluster that typifies all of the identified second documents within each respective cluster, wherein the selectable link references the selected at least one of the plurality of second documents.

27. The system of claim 17, wherein the processor determines the relatedness of the at least one second document to the first document based upon the similarity of the contents.

28. The system of claim 27, further comprising a filter for filtering out the identified at least one of the plurality of second documents that are below a predetermined similarity threshold.

29. The system of claim 17, wherein the display also displays an icon representing the type of the identified at least one second document.

30. The system of claim 17, wherein the display also displays the title of the identified at least one second document.

31. The system of claim 17, wherein the display also displays a summary of the identified at least one second document.

32. A method for displaying in a display of a previously authored first document, at least one link to another document, each other document being related to the first document, the method comprising:

selecting at least one annotated segment of the first document entered by a reader while reading the first document;

identifying at least one second document that is related to the at least one annotated segment of the first document; and displaying in the first document a selectable link for each of the at least one second document, wherein the selectable link for each of the at least one second document is displayed in the first document in response to a query passively generated by each annotation marking by the reader while reading the first document, wherein said annotation marking is a non-textual marking to annotate a textual segment used as a basis of the query.

* * * * *